United States Patent
Gupta

(10) Patent No.: US 9,608,859 B2
(45) Date of Patent: Mar. 28, 2017

(54) SYSTEM, APPARATUS AND METHOD FOR REDUCING FAILOVER TIME THROUGH REDUNDANCY USING VIRTUAL ACCESS POINTS

(71) Applicant: Aruba Networks, Inc., Sunnyvale, CA (US)

(72) Inventor: Manoj Gupta, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 237 days.

(21) Appl. No.: 14/063,444

(22) Filed: Oct. 25, 2013

(65) Prior Publication Data
US 2015/0117180 A1  Apr. 30, 2015

(51) Int. Cl.
H04L 12/24 (2006.01)
H04L 12/26 (2006.01)

(52) U.S. Cl.
CPC .......... H04L 41/0663 (2013.01); H04L 43/10 (2013.01)

(58) Field of Classification Search
CPC .................................... H04L 41/0663
USPC .................................. 370/221, 336
See application file for complete search history.

(56) References Cited

U.S. PATENT DOCUMENTS

| | | | | |
|---|---|---|---|---|
| 7,126,926 B1* | 10/2006 | Bjorklund | ............. | H04W 16/00 370/328 |
| 7,603,119 B1* | 10/2009 | Durig | ............. | H04W 48/16 455/419 |
| 8,243,623 B2* | 8/2012 | Gong | ............. | H04L 12/6418 370/254 |
| 9,100,329 B1* | 8/2015 | Jiang | ............. | H04L 45/28 |
| 9,331,923 B2* | 5/2016 | Li | ............. | H04L 43/0823 |
| 9,369,336 B1* | 6/2016 | Jamshidi | ............. | H04L 41/0654 |
| 2002/0131371 A1* | 9/2002 | Rudnick | ............. | H04L 41/082 370/252 |
| 2004/0199668 A1* | 10/2004 | Lin | ............. | H04W 48/20 709/241 |
| 2005/0070279 A1* | 3/2005 | Ginzburg | ............. | H04W 48/16 455/434 |
| 2007/0041334 A1* | 2/2007 | Song | ............. | H04W 74/0808 370/254 |
| 2007/0298720 A1* | 12/2007 | Wolman | ............. | H04L 63/1408 455/66.1 |
| 2008/0025259 A1* | 1/2008 | Ponnuswamy | ............. | H04W 24/00 370/331 |
| 2008/0025278 A1* | 1/2008 | Hoecker | ............. | H04W 76/02 370/338 |

(Continued)

Primary Examiner — Parth Patel
(74) Attorney, Agent, or Firm — Brooks, Cameron & Huebsch, PLLC

(57) ABSTRACT

According to one embodiment of the disclosure, a non-transitory computer readable medium is described for an network device, where the medium comprising instructions which, when executed by one or more hardware processors, cause performance of a number of operations. These operations include configuring a first network device to provide network access to a client device using a first Basic Service Set Identification (BSSID) and determining that the first network device is not responsive. Based on determining that the first network device is not responsive, the one or more hardware processors further configure a second network device to provide the network access to the client device using the same first BSSID that was previously used by the first network device without the client device disassociating with the first BSSID.

22 Claims, 6 Drawing Sheets

(56) References Cited

U.S. PATENT DOCUMENTS

| | | | |
|---|---|---|---|
| 2008/0040476 A1* | 2/2008 | Ishihara | H04L 43/065 709/224 |
| 2008/0056121 A1* | 3/2008 | Tsai | H04L 45/28 370/216 |
| 2008/0090575 A1* | 4/2008 | Barak | H04B 7/0417 455/444 |
| 2008/0137621 A1* | 6/2008 | Bheda | H04W 24/04 370/338 |
| 2008/0192626 A1* | 8/2008 | Yang | H04L 12/5695 370/225 |
| 2009/0235354 A1* | 9/2009 | Gray | H04L 63/1416 726/22 |
| 2009/0290493 A1* | 11/2009 | Xu | H04W 28/08 370/237 |
| 2009/0290524 A1* | 11/2009 | Seok | H04L 1/1829 370/312 |
| 2010/0165836 A1* | 7/2010 | Wahlqvist | H04W 76/028 370/225 |
| 2010/0228915 A1* | 9/2010 | Ogihara | G06F 3/0607 711/114 |
| 2011/0119360 A1* | 5/2011 | Kish | H04L 45/00 709/221 |
| 2011/0222518 A1* | 9/2011 | Ota | H04W 48/12 370/338 |
| 2011/0231559 A1* | 9/2011 | Yamaguchi | H04L 65/1069 709/228 |
| 2012/0194863 A1* | 8/2012 | Oshima | G06F 3/1204 358/1.15 |
| 2012/0294199 A1* | 11/2012 | Anchan | H04W 4/08 370/277 |
| 2013/0088952 A1* | 4/2013 | Balasubramanian | H04L 41/0659 370/217 |
| 2013/0121238 A1* | 5/2013 | Yamada | H04W 88/04 370/327 |
| 2013/0148609 A1* | 6/2013 | Ram | H04W 24/02 370/329 |
| 2013/0156016 A1* | 6/2013 | Debnath | H04W 72/0406 370/336 |
| 2013/0215735 A1* | 8/2013 | Yasumoto | H04W 24/04 370/216 |
| 2013/0286921 A1* | 10/2013 | Agarwal | 370/312 |
| 2014/0071925 A1* | 3/2014 | Liu | H04W 28/08 370/329 |
| 2014/0130118 A1* | 5/2014 | Maturi | H04L 63/20 726/1 |
| 2014/0133292 A1* | 5/2014 | Yamatsu | H04L 45/02 370/228 |
| 2014/0173124 A1* | 6/2014 | Velayudhapillai | H04L 61/2046 709/228 |
| 2014/0247711 A1* | 9/2014 | Gantman | H04W 88/06 370/221 |
| 2015/0341256 A1* | 11/2015 | Jia | H04L 45/22 370/228 |
| 2016/0112250 A1* | 4/2016 | Hu | H04L 67/16 370/216 |

* cited by examiner

SYSTEM, APPARATUS AND METHOD FOR REDUCING FAILOVER TIME THROUGH REDUNDANCY USING VIRTUAL ACCESS POINTS

FIELD

Embodiments of the disclosure relate to the field of wireless digital networks. More specifically, one embodiment of the disclosure relates to the reduction of failover times based on redundancy through virtual access points (VAPs).

GENERAL BACKGROUND

Wireless local area networks (WLANs) are becoming ubiquitous. Particularly in locations such as school and businesses, there may be a number of wireless access points (APs), each operating as a gateway for wireless connectivity to a wired network. In this type of complex networking system, there is a need to provide a redundancy mechanism with a short failover time in order to at least maintain client(s) connectivity.

Currently, conventional wireless systems are adapted to handle failover conditions based on redundancy at the controller. For instance, three primary controller-based redundancy mechanisms include backup-LMS (Local Area Network "LAN" Management Solution), Virtual Router Redundancy Protocol (VRRP), and High Availability (HA)-Lite. For backup-LMS, the AP system profile is configured with a primary and a backup LMS address. APs initially connect to the Primary LMS. When an AP loses connectivity with the primary controller, it fails over to the backup controller. As part of failover, it re-establishes the tunnel with the backup-LMS, downloads the configuration and then becomes operational. In accordance with VRRP, two controllers are configured to form a VRRP pair. The VRRP IP address is configured as the LMS in the AP system profile.

All these mechanisms provide controller-based redundancy. However, it is contemplated that redundancy provided at the edge of the network may enable compliance with more stringent failover requirements.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

I. Overview

Figure 1A:
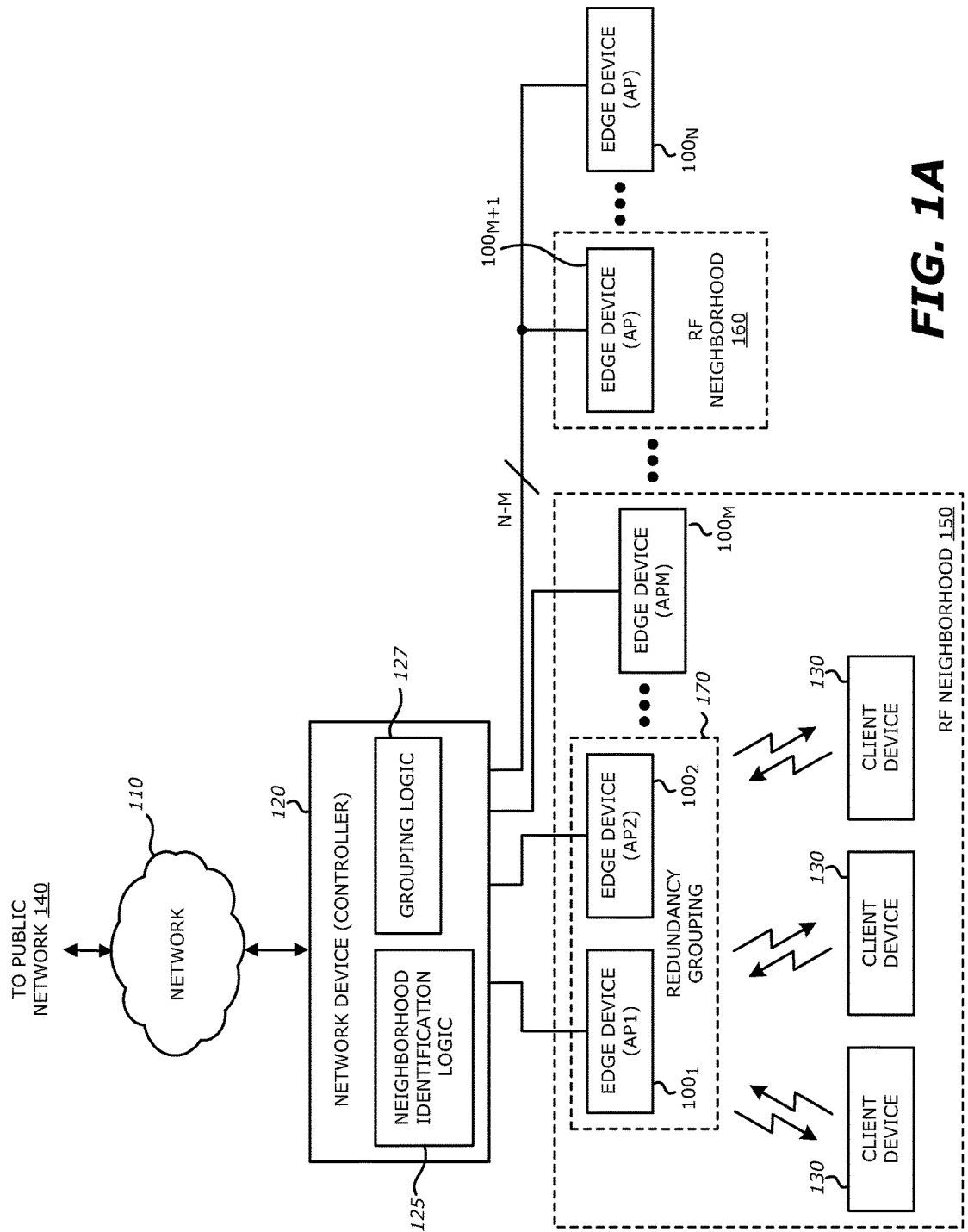
FIG. 1A is an exemplary block diagram of a wireless distributed system with BSSID redundancy located at one or more edge devices.

Embodiments of the disclosure relate to a system and framework for reducing failover time by providing redundancy for services at an edge device (e.g. an access point "AP"). In particular, a redundancy scheme may be implemented at the edge device in order to ensure that none of the Basic Service Sets (BSSes) experiences a complete disruption of service upon failure of the edge device. Hence, failure at the edge device (e.g. AP failover) is transparent to associated client devices.

In a wireless distributed system, a single edge device (e.g. an access point "AP", a base station, etc.) together with all associated client devices (STAs) is referred to as a "Basic Service Set" or "BSS". An example of a particular types of wireless distributed system includes a first type of wireless (WiFi™) network operating in accordance with the IEEE 802.11-2012 standard. It is contemplated that the invention may be applicable to other network types such as a second type of wireless (WiMax™) network (representative of an IEEE 802.16-based network), and/or a Bluetooth™ network.

Herein, the BSS is uniquely identified by a BSS Identification (BSSID), which also correlates to a Service Set Identifier (SSID) being the informal name of the BSS. For a BSS operating in infrastructure mode, the BSSID is the Media Access Control (MAC) address of a Virtual Access Point (VAP). By placement of BSSID redundancy at the edge devices, in lieu of controller-based redundancy, faster failover may be achieved.

In general, according to one embodiment of the invention, redundant edge devices are chosen from the same radio frequency (RF) neighborhood, such as the same clique set that features two or more edge devices operating within the same RF neighborhood. Herein, at least two neighboring edge devices being part of the same clique set, also referred to as a "redundant grouping," include BSSIDs stored in redundancy for each other. For instance, a first network (edge) device is adapted with both a first storage portion that stores a first plurality of available BSSIDs associated with BSSes primarily handled by the first network device (referred to as "primary BSSIDs") and a second storage portion. The second storage portion is configured to store a second plurality of BSSIDs (referred to as "backup BSSIDs") that are associated with BSSes primarily supported by the second network (edge) device of the redundant grouping.

According to one embodiment of the disclosure, two types of messages may be used to trigger a failover event. A first type of message, which is referred to as an "AP heartbeat," is a message transmitted between a network (edge) device and a controller on a wired link. A second type of message, which is referred to as a "virtual AP heartbeat," is a message between network (edge) devices in the same redundant grouping. Herein, a second edge device listens to messages associated within BSSes including the first edge device. In response to no heartbeat messages being detected during prescribed transmission times (e.g. heartbeat messages are missed "B" times consecutively or in total, where "B" may be set to any integer value and/or for a prescribed time (e.g. 3 beacons or 300 milliseconds), a heartbeat miss event is considered to have occurred. Upon detecting the heartbeat miss event that constitutes a failover triggering event, the second edge device (or one of the redundant edge devices) activates the backup BSSes available with it.

In order to achieve transparent failover, both edge devices need to synchronize information for the BSS(es) currently active on each other. Examples of information to be synchronized may include two or more of the following: (1) Timing Synchronization Function (TSF); (2) associated Client MAC addresses; (3) client information (e.g. association identifier, power-save state, capabilities, rates, etc.); and/or (4) encryption key(s).

In summary, one embodiment of the disclosure describes a non-transitory computer readable medium comprising instructions which, when executed by one or more hardware processors, causes performance of operations including, subsequent to a client device associating with a first Basic Service Set Identification (BSSID), configuring a first edge device to provide services to the client device by the first edge device using the first BSSID to communicate with the client device. Examples of such services may include, but are not limited or restricted to network connectivity. Upon determining that the first edge device is not responsive, a second edge device is configured to provide the services to the client device by the second edge device using the first BSSID to communicate with the client device without the client device disassociating with the first BSSID.

II. Terminology

Herein, certain terminology is used to describe features within embodiments of the invention. For example, the term "network device" generally refers to electronic equipment configured to communicate over a wired and/or wireless network and process information related to such communications. Hence, the network device may be adapted with circuitry to support wireless connectivity with other network devices being part of a wireless network. Different types of network devices may include, but are not limited to (1) a client device being any consumer electronics with connectivity to multiple networks that are based on different technologies such as cellular, wireless (e.g., WiFi™ or WiMax™), Bluetooth™ or the like; (2) an edge device; and/or (3) a data control device.

Herein, an "edge device" may include a wireless access point, a wireless base station, a Bluetooth® receiver/transceiver, or any device configured as a hot spot or gateway for providing services such as network connectivity, which may include any type of mobile network device. A "client device" may be a stationary network device (e.g., desktop computer, television, set-top box, video gaming console, etc.) or a mobile network device capable of connecting to one or more networks. Illustrative examples of mobile network devices may include a tablet, laptop, netbook, bar-code scanner, a digital camera, and/or a mobile handset such as a smartphone, personal digital assistant "PDA", or the like. Likewise, illustrative examples of a data control device may include, but are not restricted to a network switch, a controller, a router, a brouter, or the like.

It is contemplated that a network device includes hardware logic such as one or more of the following: (i) processing circuitry; (ii) one or more communication interfaces such as a radio (e.g., component that handles the wireless data transmission and/or reception) and/or a physical connector to support wired connectivity; and/or (iii) memory in the form of a non-transitory computer readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.); or any connector for receiving a portable memory device such as a Universal Serial Bus "USB" flash drive, portable hard disk drive, or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory computer readable medium (described above) or transitory computer readable transmission media (e.g., electrical, optical, acoustical or other form of propagated signals such as carrier waves, infrared signals, digital signals).

The term "link" is a physical or logical communication path between two or more network devices. Examples of links supporting wireless communications may include certain radio frequency (RF) channels and/or bands, as well as the logic associated therewith.

The terms "connected" and "connection" generally relate to an established communication path between two network devices that enables one network device to transfer data targeted specifically for receipt by the other network device.

The term "message" generally refers to information transmitted as information in a prescribed format, where each message may be in the form of a packet, a frame, an Asynchronous Transfer Mode (ATM) cell, or any other series of bits having the prescribed format.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Referring to FIG. 1A, an exemplary embodiment of a wireless distributed system with BSSID redundancy located at one or more edge devices is shown. Herein, according to one embodiment of the disclosure, each of the one or more (N) edge devices $100_1$-$100_N$ operates as a gateway to provide communicative coupling to a wired network 110 which provides access to a common, public network 140 such as the Internet. Such communicative coupling may be via a centralized network device 120 (e.g. controller) or may be conducted directly by the various edge devices. These edge devices $100_1$-$100_N$ may include one or more access points (APs) that control connectivity over a first wireless (WiFi™) network, and/or one or more wireless base stations that control connectivity to a second wireless (WiMAX™) network. Each of these edge devices $100_1$-$100_N$ enables one or more client devices 130, such as a mobile network device for example, to access public network 140.

As shown, edge devices $100_1$-$100_N$ (M≥2) are within the same RF neighborhood 150 as, at least, wireless signaling from edge device $100_1$ is detected by edge device $100_2$ and wireless signaling from edge device $100_2$ is detected by edge device $100_1$. However, edge device $100_{M+1}$ may be within a different RF neighborhood 160 as signaling from edge devices $100_1$-$100_M$ are not detected by edge device $100_{M+1}$ and vice versa. Hence, edge device $100_{M+1}$ is outside the coverage areas of edge devices $100_1$-$100_M$. The selection of redundant groupings within the RF neighborhood 150 may be accomplished through the formation of clique sets as described in U.S. patent application Ser. No. 13/959,603 entitled "Task Processing and Resource Sharing In a Distributed Wireless System," the entire contents of which are incorporated by reference.

In particular, according to one embodiment of the disclosure, centralized network device 120 may be configured with neighborhood identification logic 125, namely software including routines for identifying a plurality of network devices. In some embodiments, the neighborhood identification logic 125 can be a set of instructions executable by the processor (not shown) within the network device 120 that provide the functionality described below for identifying a clique for selection of redundant network device(s).

In particular, the neighborhood identification logic 125 determines a list of available network devices in a wireless distributed system, and identifies a plurality of network devices from the list of available network devices, where each identified network device in the plurality of network devices has a radio frequency (RF) neighborhood that includes the other network devices. For an identified network device in the plurality of network devices, a RF neighborhood of the identified network device includes the other network devices, and the other network devices are capable of hearing messages, such as beacons for example, from the network device. In other words, each identified network device in the plurality of network devices is in an RF neighborhood with other network devices that are each capable of hearing each other's messages.

Herein, as an illustrative embodiment shown in FIG. 1A, network devices $100_1$-$100_3$ are RF neighboring network devices. The network devices $100_1$-$100_3$ are "RF neighbors" as these devices have a similar view of a communication network. For example, network devices $100_1$-$100_3$ are located in close geographical proximity to each other so that they are neighbors and operate in the same radio frequency environment. In some embodiments, network devices $100_1$-$100_3$ are "RF neighbors" if client device 130 is able to connect to network devices $100_1$-$100_3$. In some embodiments, network devices $100_1$-$100_3$ are RF neighbors if a task (e.g., a channel scanning task or a load balancing task) which can be processed by one network device $100_1$ can also be processed by the other network device $100_2$ and $100_3$. For example, three network devices $100_1$-$100_3$ are "RF neighbors" if the same result is produced for the same task being performed on either network device. In some embodiments, network devices $100_1$-$100_3$ are "RF neighbors" if their radio frequency spectrums are substantially overlapped with each other.

In some embodiments, any network device in the identified plurality of network devices is an RF neighbor if it is associated with a RF spectrum that is substantially overlapped with RF spectrums of the other network devices. For example, a spectrum associated with one network device is at least 70% overlapped with a spectrum associated with the other network device constitutes an RF neighbor. In some embodiments, the plurality of network devices $100_1$-$100_M$ can be identified manually. In some other embodiments, the plurality of network devices can be identified automatically.

In some embodiments of the disclosure, first network device $100_1$ generates and sends a particular message to a second network device $100_2$ that is in the RF neighborhood of the second network device $100_2$, and the second network device $100_2$ is also in the RF neighborhood of the first network device $100_1$. The particular messages are used to establish one or more redundancy groupings 170 (e.g. clique set) from the plurality of network devices $100_1$-$100_M$ of the RF neighborhood, where the redundancy grouping is automatically conducted under control by network device 120 or manually controlled.

As an exemplary embodiment, this grouping logic 127 can be software including routines for identifying one or more redundancy groupings (e.g. clique sets). In some embodiments, the grouping logic 127 can be a set of instructions executable by the processor (not shown) to provide the functionality described below for identifying one or more redundancy groupings. In some other embodiments, the grouping logic 127 can be stored in the memory of the network device 130 and can be accessible and executable by the processor (not shown). The grouping logic 127 may be adapted for cooperation and communication with the processor and other components of the network device 120.

A "redundancy grouping" and "clique set" are generally defined as a set of network devices with any two or more network devices in the grouping (or set) being RF neighbors. In some embodiments, the redundancy grouping is a subset of RF neighbors such that each of the device is RF neighbor of each other. For instance, device A, B and C may be in an RF neighborhood such that A is in neighborhood of B and not in RF neighborhood of C (e.g. 3 APs placed in a straight line). In such case, RF neighborhood of B has both A and C but it's redundancy group can have either A or C.

Figure 1B:
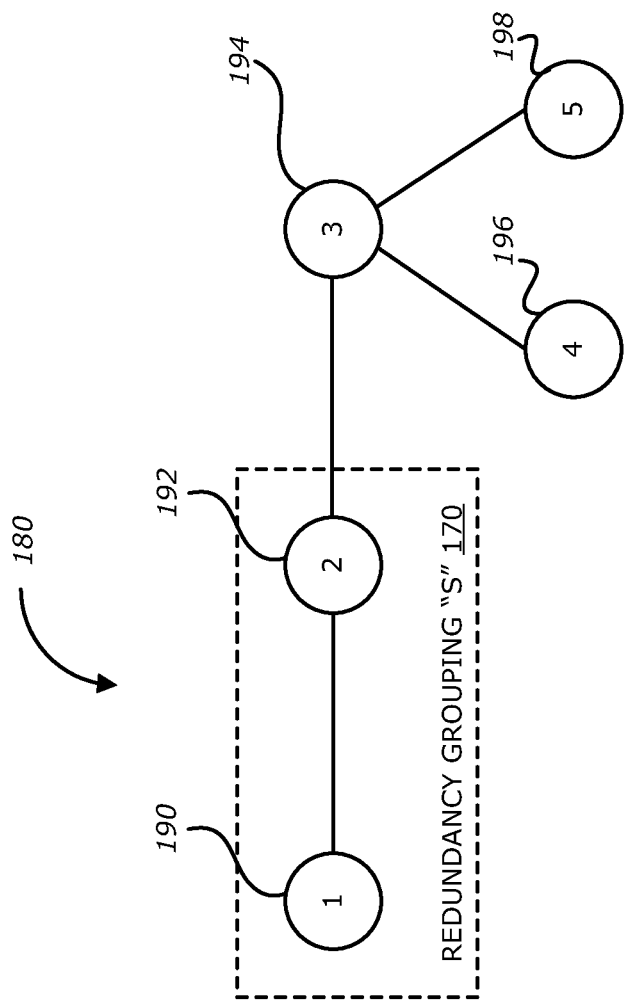
FIG. 1B is an exemplary block diagram of a undirected graph G(V, E) that is used to represent network devices available in a distributed wireless system for establishing redundancy groupings.

In some embodiments, as shown in FIG. 1B, an undirected graph G(V, E) 180 is used to represent network devices available in a distributed wireless system, where the set "V" (V=5) includes all the vertices in the graph with each vertex representing one network device, and the set "E" (E=4) represents all the connection in the graph. If three network devices $100_1$, $100_2$ and $100_3$ are RF neighbors, three vertices 190, 192 and 194 representing the three network devices $100_1$, $100_2$ and $100_3$ are connected by an undirected connections in the graph while vertices 196 and 198 represent network devices $100_4$ and $100_5$ (M=3; N=5). The redundancy grouping 170 (represented by a symbol "S") is a subset of the set "V" (e.g., S is a subset of V), where any two vertices in the redundancy grouping "S" are connected (e.g., the network devices in the redundancy grouping are pair wise connected to each other). The size of the redundancy grouping "S" is the number of vertices included in the set "S." An exemplary graph and redundancy grouping is illustrated in FIG. 1B.

IV. Redundancy Scheme

According to one embodiment of the disclosure, one or more edge devices (e.g. edge devices $100_1$-$100_2$) from the same redundancy grouping 170 may be selected as for redundancy. For instance, second edge device $100_2$ may be selected to operate as a redundant edge device for first edge device $100_1$, as thus, second edge device $100_2$ includes backup BSSes for edge device $100_1$. Similarly, first edge device $100_1$ operates to include backup BSSes for second edge device $100_2$ as shown in FIG. 2.

Figure 2:
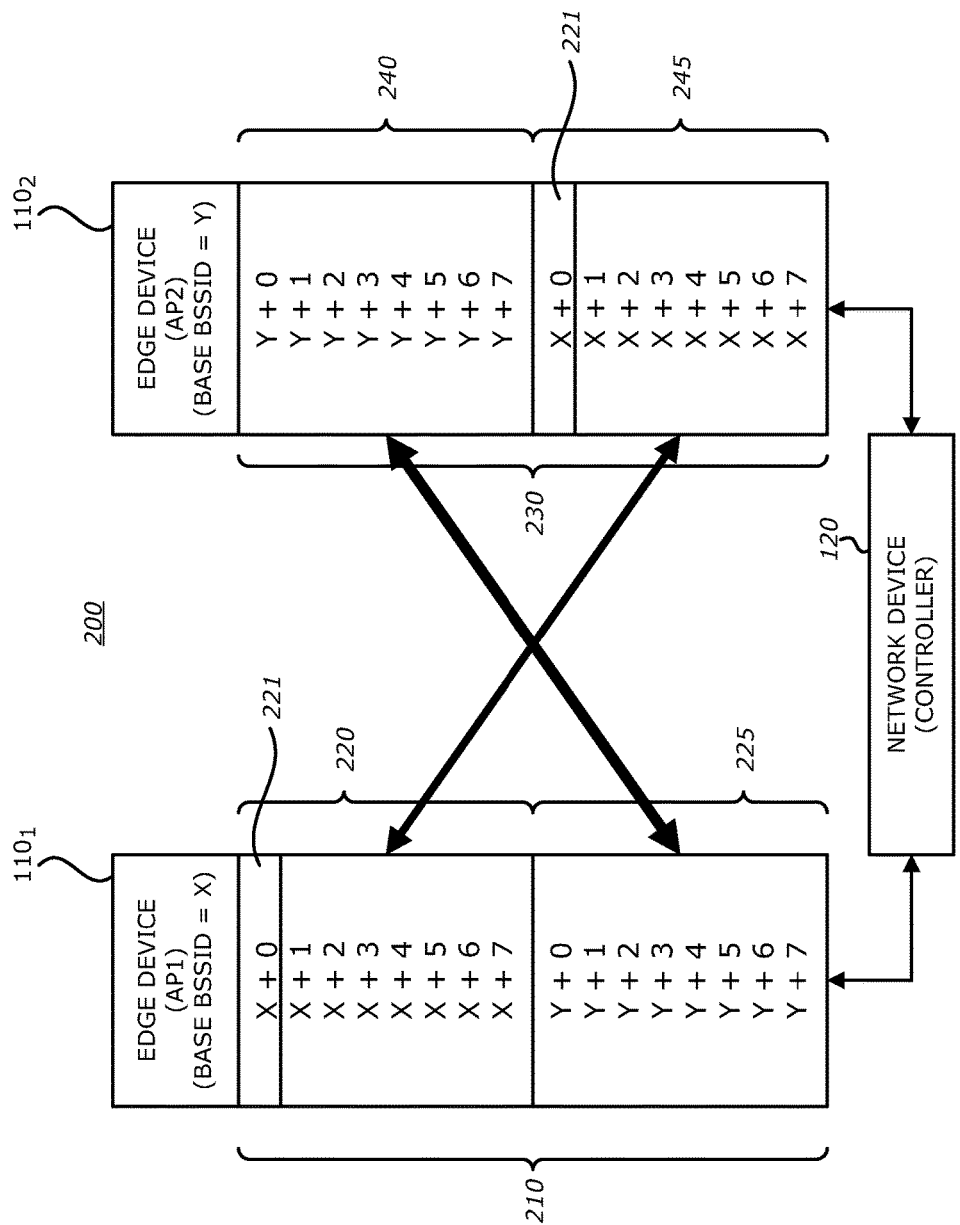
FIG. 2 is an exemplary embodiment of VAP redundancy between first and second edge devices forming a first redundancy grouping.

Referring to both FIGS. 1A and 2, first edge device $100_1$ is communicatively coupled to network device 120 which operates as a controller. Similarly, second edge device $100_2$ is communicatively coupled to network device 120. According to this illustrative embodiment, both first edge device $100_1$ and second edge device $100_2$ constitute access points (APs) within the same redundancy grouping. More specifically, AP1 $100_1$ operates as part of a redundant grouping 200 with AP2 $100_2$.

As further shown in FIG. 2, AP1 $100_1$ is configured to handle "S" identifiers 210, and AP $100_2$ is also configured to handle "S" identifiers 230. For illustrative purposes, the number of identifiers (S) is set as sixteen and the type of identifiers may include BSSIDs. According to one embodiment of the disclosure, AP1 $100_1$ is configured to support a first group of BSSIDs 220 (referred to as "primary BSSIDs") along with a second group of BSSIDs 225 (referred to as "backup BSSIDs"). As shown, the number of primary BSSIDs 220 may be equal in number (eight) to the number of backup BSSIDs 225, although it is contemplated that the number of primary BSSIDs 220 may exceed the number of backup BSSIDs 225 or the number of backup BSSIDs 225 may exceed the number of primary BSSIDs 220.

Herein, AP1 $100_1$ has a base address "X" and AP2 $100_2$ has a base address "Y". Hence, first group of BSSIDs 220 (starting with base BSSID "X") is equivalent to the backup BSSIDs 245 within AP2 $100_2$. Similarly, second group of BSSIDs 225 (starting with base BSSID "Y") constitutes backup BSSIDs that are equivalent to the primary BSSIDs 240 within AP2 $100_2$. Hence, in response to a primary BSSID 221 (e.g. BSSID "X") experiencing a failover triggering event, under control by the network device 120 or operating independently, AP2 $100_2$ is now configured to support BSSID "X" previously supported by AP1 $100_1$.

It is noted that FIG. 2 illustrates a redundant scheme [1:1] in which redundancy is provided by a counterpart edge device and the number of backup BSSes supported are equal in number to the number of primary BSSes supported. However, it is contemplated that multiple edge devices may provide redundancy for a corresponding AP (e.g. a first set of backup BSSes is supported by one "redundant" edge device while another set of backup BSSes is supported by another redundant edge device). Assigned with a unique identifier (e.g. MAC address or derivation thereof) normally at configuration, each edge device advertises this unique identifier in a Vendor Information Element (IE) in a broadcast message (e.g. beacon). Selection of redundant edge device is as simple as the edge device having the lowest ID operating at any point of time. For example if primary edge device has ID X and two redundant edge devices have IDs Y and Y+Z, when edge device X fails, edge device having ID Y will take over. Since all APs are hearing each other Y as well as Y+Z know the presence/absence of each other.

For instance, AP2 $100_2$ may be selected as a part of a redundant grouping with AP1 $100_1$ based on AP2 $100_2$ having the greater signal strength measurement for access points detected by AP1 $100_1$. Alternatively, AP2 $100_2$ and AP3 $100_3$ may be selected as a part of a redundant grouping with AP1 $100_1$, where both AP2 $100_2$ and AP3 $100_3$ include backup BSSIDs for primary BSSIDs associated with AP1 $100_1$. As a result, in response to detecting of a failover triggering event at AP1 $100_1$, the AP2 $100_2$ and AP3 $100_3$ operate as redundant APs for client devices associated with AP1 $100_1$. Similarly, AP1 $100_2$ and AP2 $100_3$ include backup BSSIDs for primary BSSIDs associated with AP3 $100_2$, and AP1 $100_1$ and AP3 $100_3$ include backup BSSIDs for primary BSSIDs associated with AP2 $100_2$.

V. Synchronization for Transparent Failover

Figure 3:
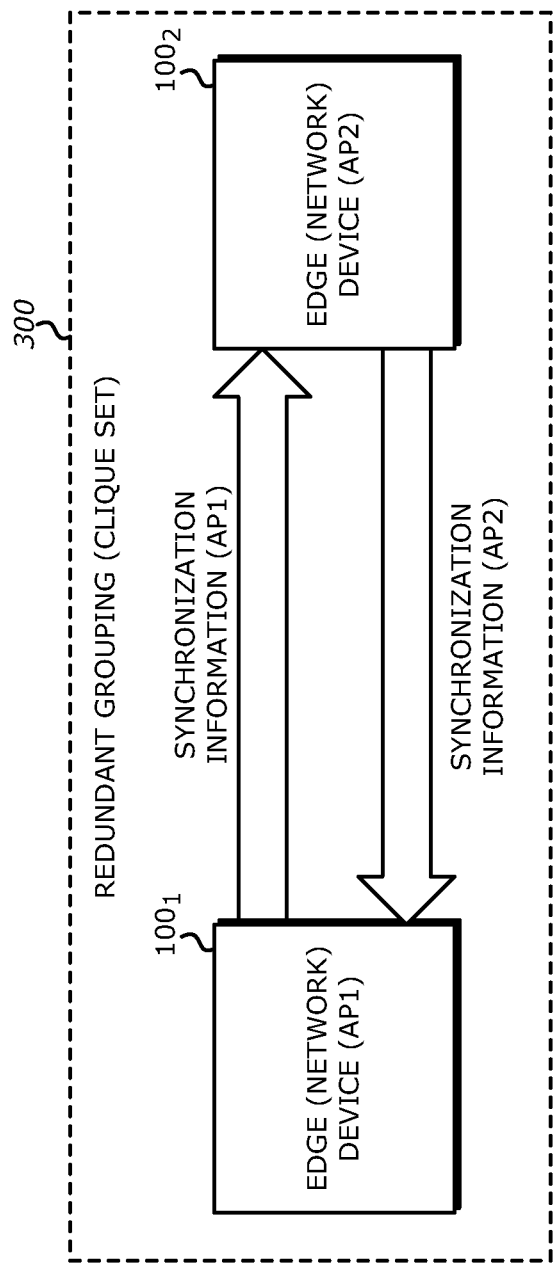
FIG. 3 is an exemplary embodiment of signaling between edge devices of the first redundancy grouping in order to synchronize the edge devices for transparent failover.

Referring now to FIG. 3, an exemplary embodiment of signaling in order to synchronize edge devices for transparent failover is described. Herein, a first edge device $100_1$ and the second edge device $100_2$ are communicatively coupled and operate as a redundant grouping 300. As the operating states for each of the edge devices $100_1$ and $100_2$ forming the redundant grouping 300 frequently vary, certain state information 310 from edge device $100_1$ needs to be continuously shared with edge devices $100_2$. Similarly, certain state information 320 from edge device $100_2$ needs to be continuously shared with edge devices $100_1$. Such state information 310 and 320 may include, but it is not limited or restricted to two or more of the following: (1) Timing Synchronization Function (TSF) information; (2) associated Client MAC addresses; (3) client information (e.g. association identifier, power-save state, capabilities, rates, etc.); and/or (4) encryption key(s)

Herein, the TSF information is configured to maintain synchronization between the timers associated with the network devices, namely at least edge devices $100_1$ and $100_2$. The Client MAC addresses are the MAC addresses for the client devices associated with the other edge device. For instance, edge device $100_1$ supplies to second edge device $100_2$ MAC address for the client devices associated with edge device $100_1$. This client MAC address listing is modified continuously as associations by the client devices may vary, especially for mobile client devices.

Besides TSF information and the Client MAC addresses, edge device $100_1$ supplies client information to second edge device $100_2$, where the client information may include one or more association identifiers (AIDs), power-saving state information associated with each client device, transmission rates associated with each client device and other client capabilities. Encryption keys need to be synchronized to enable edge device $100_2$ to decrypt information from a client device currently associated with edge device $100_1$ if the VAP associated with edge device $100_1$ fails.

Figure 4:
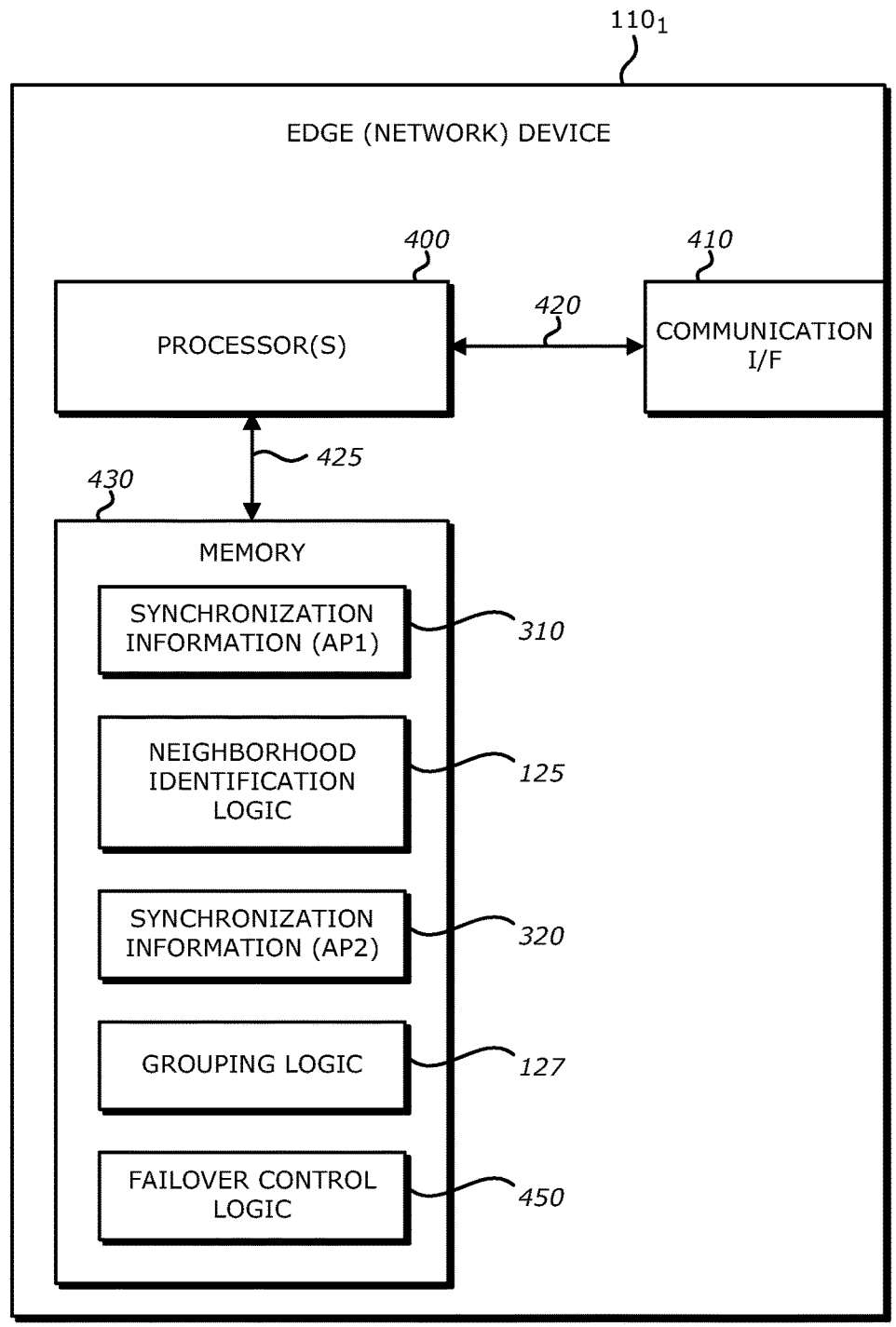
FIG. 4 is an exemplary embodiment block diagram of logic associated with an edge (network) device.

Referring now to FIG. 4, an exemplary block diagram of logic associated with the edge (network) device $100_1$ is illustrated. Edge device $100_1$ comprises one or more processors 400 that are coupled to communication interface logic 410 via a first link 420. Communication interface logic 410 enables wireless and/or wired communications with other network devices such as edge device $100_2$, centralized network device 120, or the like. According to one embodiment of the disclosure, communication interface logic 410 may be implemented as a physical interface including one or more ports for wired connectors. Additionally, or in the alternative, communication interface logic 410 may be implemented with one or more radio units for supporting wireless communications with other network devices.

Processor 400 is further coupled to a memory device 430 via a second link 425. According to one embodiment of the disclosure, the memory device 430, such as persistent storage for example, may include neighborhood identification logic 125, grouping logic 127, device-specific synchronization information 310, neighboring device synchronization information 320, and failover control logic 450.

As described above, neighborhood identification logic 125 and grouping logic 127 are adapted to identify and establish one or more RF neighborhoods and one or more redundant groupings (e.g. cliques) associates with the RF neighborhood(s). The device-specific synchronization information 310 includes information associated with the first edge device $100_1$ that is continuously monitored, updated (when applicable) and provided to its corresponding redundant edge device(s) (e.g., edge device $110_2$). The neighboring device synchronization information 320 associated with the second edge device $100_2$ and continuously provided therefrom.

Failover control logic 450 responds to a failure by another edge device that is part of the redundant grouping, normally through detection of a prolonged interruption of heartbeat messages exchanged between the edge device and other network devices. A "heartbeat message" is a periodic signal generated by hardware and/or software to indicate normal operations or synchronize different logic within a network device. For instance, according to one embodiment of the disclosure, a plurality of heartbeat messages may be used to trigger a failover event. One type of heartbeat message may be referred to as an "AP heartbeat," which is periodic signaling between edge device $110_1$ and centralized network device 120 of FIG. 2 over a wired link. Another type of heartbeat message may be referred to as a "virtual AP heartbeat," which is periodic signaling between edge device $110_1$ and its redundant grouping device (e.g. edge device $110_2$).

For a particular BSS identified by BSSID (e.g. BSSID "Y"), if failover control logic 450 fails to detect the presence of an AP heartbeat and/or a virtual AP heartbeat from network device $100_2$ for "T" consecutive times intervals (e.g. "T" beacons, where T≥3), the failover control logic 450 determines that a heartbeat miss event has occurred, which constitutes a failover triggering event. In response to an occurrence of the failover triggering event, edge device $100_1$ activates the backup BSS identified by BSSID "Y" that is primarily handled by edge device $100_2$. Hence, edge device $100_1$ operates as a backup AP by providing services to those client devices that were previously provided services by edge device $100_2$ without requiring client devices associated with a particular BSS (BSSID "Y") to be disassociated from that particular BSS. Hence, by activation of the backup BSS, at least the BSS remains in service despite an operating failure by edge device $100_2$.

Upon determining that the edge device $100_2$ has resumed being responsive and in an active status, which may be determined by repeated detection of the above-identified heartbeat messages, the primary BSS identified by BSSID "Y" is re-activated and the backup BSS (BSSID Y) maintained by edge device $100_1$ is deactivated without client devices disassociating from the BSSID "Y".

Figure 5:
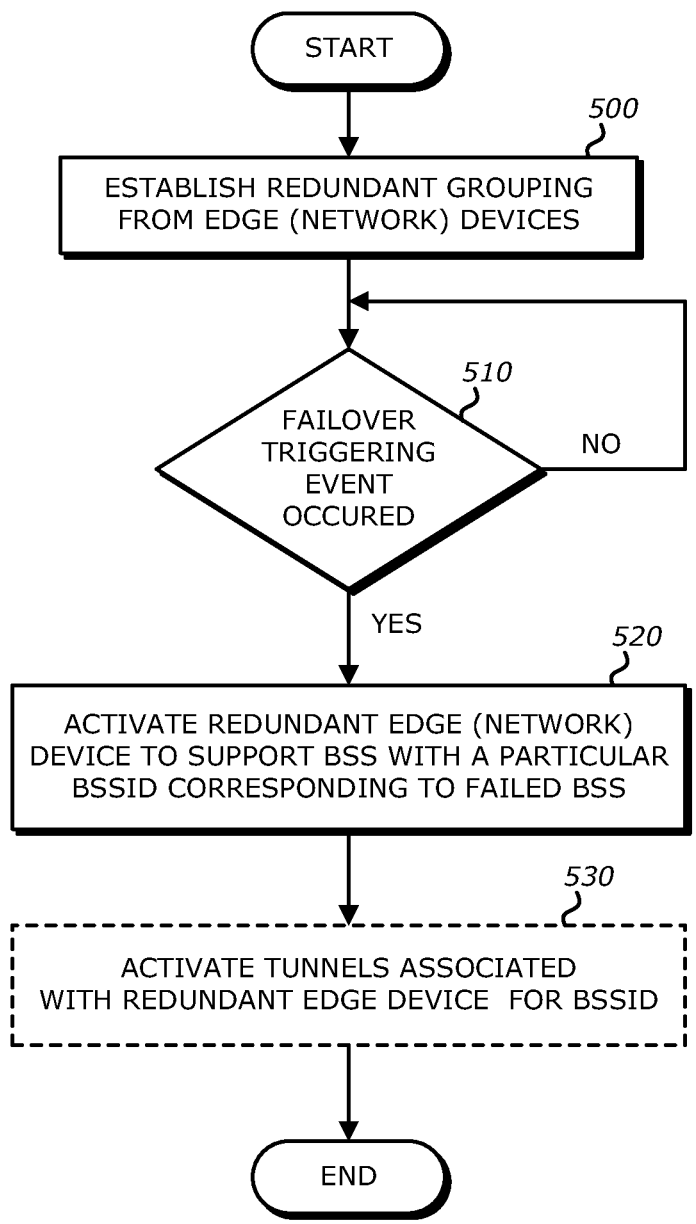
FIG. 5 is an exemplary flowchart of the enhanced VAP redundancy.

Referring to FIG. 5, an exemplary flowchart of the enhanced VAP redundancy is shown. Initially, a redundant grouping is created in which two or more edge (network) devices operate as redundant VAPs for each other (block 500). Herein, the redundant grouping includes at least a first edge device and a second edge device.

In response to a failover triggering event associated with a BSS managed by the second edge device (identified by "BSSID-Y"), the first edge device now supports BSSID-Y, namely a BSS having a backup BSSID corresponding to the failed BSSID-Y (blocks 510 and 520). Thereafter, as an optional feature, when the backup BSS becomes active, the backup tunnels to the centralized network device (e.g., controller) also are activated as prior tunnels associated with the primary BSS are inactive (block 530).

Although not shown, in response to the second edge device returning to an active status and being able to again support the backup BSS (BSSID-Y), it is contemplated that the second edge device actively supports services pertaining to BSSID-Y while the first edge device halts providing further services pertaining to BSSID-Y. Hence, the second edge device now is responsible for services requested by the associated client device(s). Of course, alternatively, first edge device may continue to actively support services pertaining to BSSID-Y until a load or capacity factor is reached by the first edge device, after which, the second edge device would regain its support of BSSID-Y and providing services to its associated client device(s).

This invention may be embodied in other forms without departing from the spirit or essential attributes thereof. Accordingly, reference should be made to the following claims, rather than to the foregoing specification, as indicating the scope of the invention.

What is claimed is:

1. A non-transitory computer readable medium stored on one or more network devices comprising instructions which, when executed by one or more hardware processors, cause the one or more hardware processors to:
store, on a first network device, a plurality of Basic Service Set Identifications (BSSIDs) including:
a first BSSID identifying a first Basic Service Set (BSS) handled by the first network device; and
a second BSSID identifying a second BSS handled by a second network device;
wherein the second network device provides network access to a client device using the second BSSID;
determine that the second network device is not responsive;
based on the determination that the second network device is not responsive, activate a tunnel from the client device to the first network device and configure the first network device to provide the network access to the client device via the tunnel using the second BSSID that was previously used by the second network device without the client device disassociating from the second BSS; and
based on a determination that the second network device has resumed being responsive, configure the first network device to stop providing network access to the client device based on a capacity factor being reached by the first network device and configure the second network device to provide network access to the client device without the client device disassociating from the second BSS.

2. The non-transitory computer readable medium of claim 1, wherein the first and second BSSIDs are stored on the first network device prior to the determination that the second network device is not responsive.

3. The non-transitory computer readable medium of claim 1, wherein the first BSSID is an address of a virtual access point (a) used by the first network device while the first network device is determined to be responsive and (b) used by the second network device subsequent to determining that the first network device is not responsive.

4. The non-transitory computer readable medium of claim 1, the instructions further cause the one or more hardware processors to receive state information associated with the client device from the second network device prior to the determination that the second network device is not responsive.

5. The non-transitory computer readable medium of claim 1, wherein the first network device is a first access point and the second network device is a second access point.

6. The non-transitory computer readable medium of claim 5, wherein prior to configuring the first access point to provide network access to the client device, the one or more hardware processors are further to select the second access point, from a plurality of access points associated with the first BSSID, for redundantly storing the first BSSID based on a presence of the second access point within a radio frequency (RF) neighborhood of the first access point.

7. The non-transitory computer readable medium of claim 5, wherein responsive to the determination that the second access point has resumed being responsive, the instructions cause the one or more hardware processors to configure the first access point to stop providing network access to the client device and the second access point to provide network access to the client device without the client device disassociating from the second BSS.

8. The non-transitory computer readable medium of claim 5, wherein the second access point is a backup access point configured to provide network access to all client devices associated with the first BSSID based on a determination that the first access point is not responsive.

9. The non-transitory computer readable medium of claim 5, wherein the determination that the second access point is not responsive is based on the first access point failing to detect one or more messages expected from the second access point.

10. The non-transitory computer readable medium of claim 5, wherein the determination that the second access point is not responsive is based on a failure to detect, within a prescribed time interval, both a first heartbeat message directed from the second access point to a controller and a second heartbeat message directed from the second access point to the first access point.

11. The non-transitory computer readable medium of claim 5, wherein to configure the first access point, the one or more hardware processors are to configure the first access point to respond to a first set of messages, transmitted by the client device, that identify the second BSSID.

12. A method comprising:
storing, on a first access point, a plurality of Basic Service Set Identifications (BSSIDs) including a first BSSID identifying a first Basic Service Set (BSS) handled by the first access point and a second BSSID identifying a second BSS handled by a second access point, wherein the second access point provides services to a client device using the second BSSID;
determining that the second access point is not responsive;
based on the determination that the second access point is not responsive, activating a tunnel from the client device to the first access point and configuring the first access point to provide the services to the client device via the tunnel using the second BSSID that was previously used by the second access point without the client device disassociating from the second BSS; and
responsive to determining that the second access point has resumed being responsive, configuring the first access point to stop providing the services to the client device based on a capacity factor being reached by the first access point and configure the second access point to provide the services to the client device without the client device disassociating from the second BSS.

13. The method of claim 12, wherein storing the first and second BSSIDs on the first access point and the second access point is prior to determining that the first access point is not responsive.

14. The method of claim 12, wherein the first BSSID is an address of a virtual access point (a) used by the first access point while the first access point is determined to be responsive and (b) used by the second access point subsequent to determining that the first access point is not responsive.

15. The method of claim 12, further comprising:
receiving state information associated with the client device from the second access point prior to determining that the first access point is not responsive.

16. The method of claim 12, wherein prior to configuring the first access point to provide the services to the client device, the method further comprises selecting the second access point, from a plurality of access points associated with the first BSSID, for redundantly storing the first BSSID based on a presence of the second access point within a radio frequency (RF) neighborhood of the first access point.

17. The method of claim 12, wherein the second access point is a backup access point configured to provide the services to all client devices associated with the first BSSID based on determining that the first access point is not responsive.

18. The method of claim 12, wherein determining that the first access point is not responsive comprises failing to detect one or more messages expected from the first access point.

19. The method of claim 12, wherein determining that the first access point is not responsive comprises failing to detect, within a prescribed time interval, both a first heartbeat message directed from the first access point to a controller and a second heartbeat message directed from the first access point to the second access point.

20. The method of claim 12, wherein configuring the first access point comprises configuring the first access point to respond to a first set of messages, transmitted by the client device, that identify the first BSSID, and
wherein the method further comprises configuring the second access point to respond to a second set of messages, transmitted by the client device, that identify the same first BSSID.

21. A first access point, comprising:
one or more hardware processors; and
a memory coupled to the one or more hardware processors, the memory including a plurality of Basic Service Set Identifications (BSSIDs) and failover control logic that:
when a second access point that is configured to provide services to at least one client device using a first Basic Service Set Identification (BSSID) is determined to be non-responsive, activates a tunnel from the client device to the first access point and provides network access to the at least one client device via the tunnel using the same first BSSID that was previously used by the second access point and is one of the plurality of BSSIDs without the at least one client device disassociating from the first BSSID; and
when the second access point is determined to have resumed being responsive, stop providing network access to the at least one client device based on a capacity factor being reached by the first client device, wherein the second access point resumes providing network access to the at least one client device.

22. The first access point of claim 21, wherein the failover control logic receives a message from a controller that at least identifies that the second access point is non-responsive.

* * * * *